Sept. 10, 1940.　　H. F. KURTZ　　2,214,376
PROJECTION APPARATUS
Filed Sept. 21, 1938　　4 Sheets-Sheet 1

HENRY F. KURTZ
INVENTOR
BY
ATTORNEYS

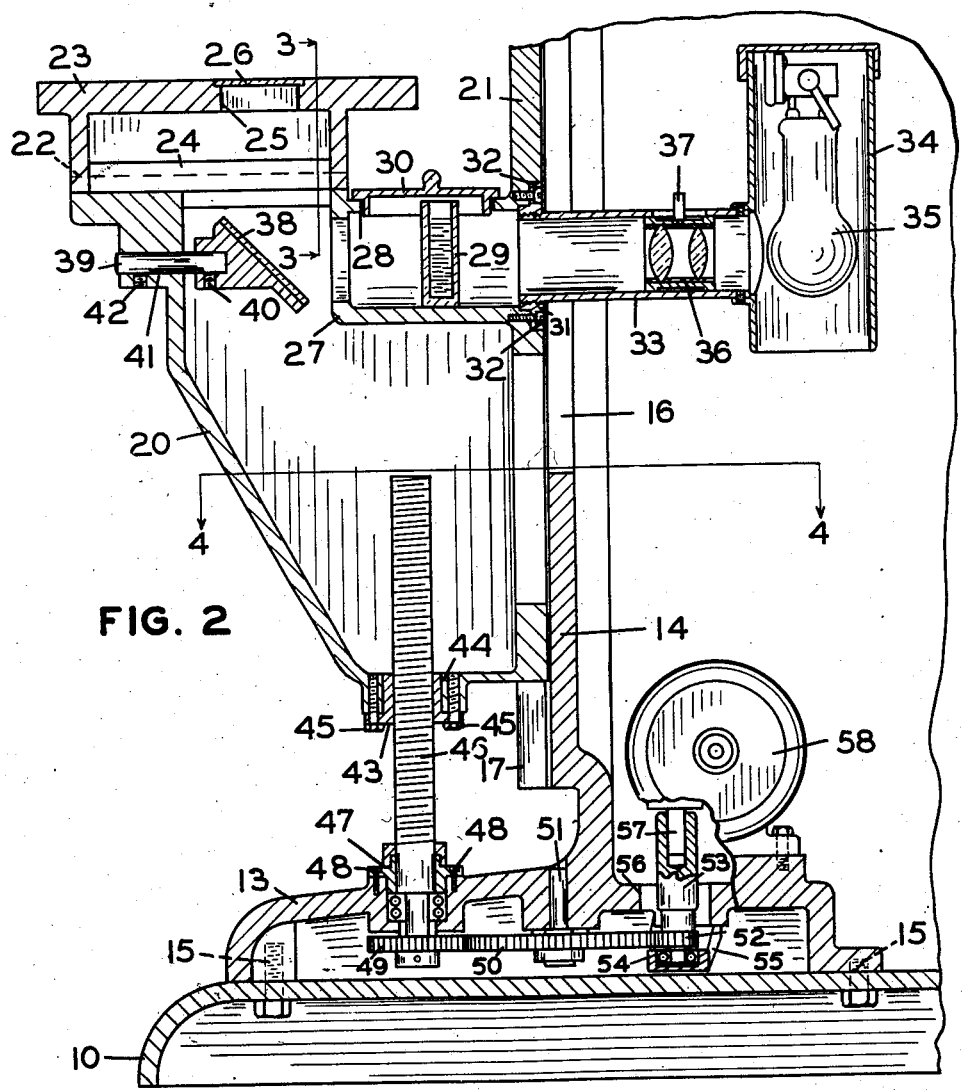
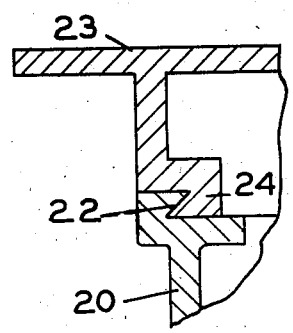
FIG. 2
FIG. 3
Sept. 10, 1940.   H. F. KURTZ   2,214,376
PROJECTION APPARATUS
Filed Sept. 21, 1938   4 Sheets-Sheet 2
HENRY F. KURTZ
INVENTOR
BY
ATTORNEYS Sept. 10, 1940.  H. F. KURTZ  2,214,376
PROJECTION APPARATUS
Filed Sept. 21, 1938  4 Sheets-Sheet 3

HENRY F. KURTZ
INVENTOR

Sept. 10, 1940.  H. F. KURTZ  2,214,376
PROJECTION APPARATUS
Filed Sept. 21, 1938  4 Sheets-Sheet 4
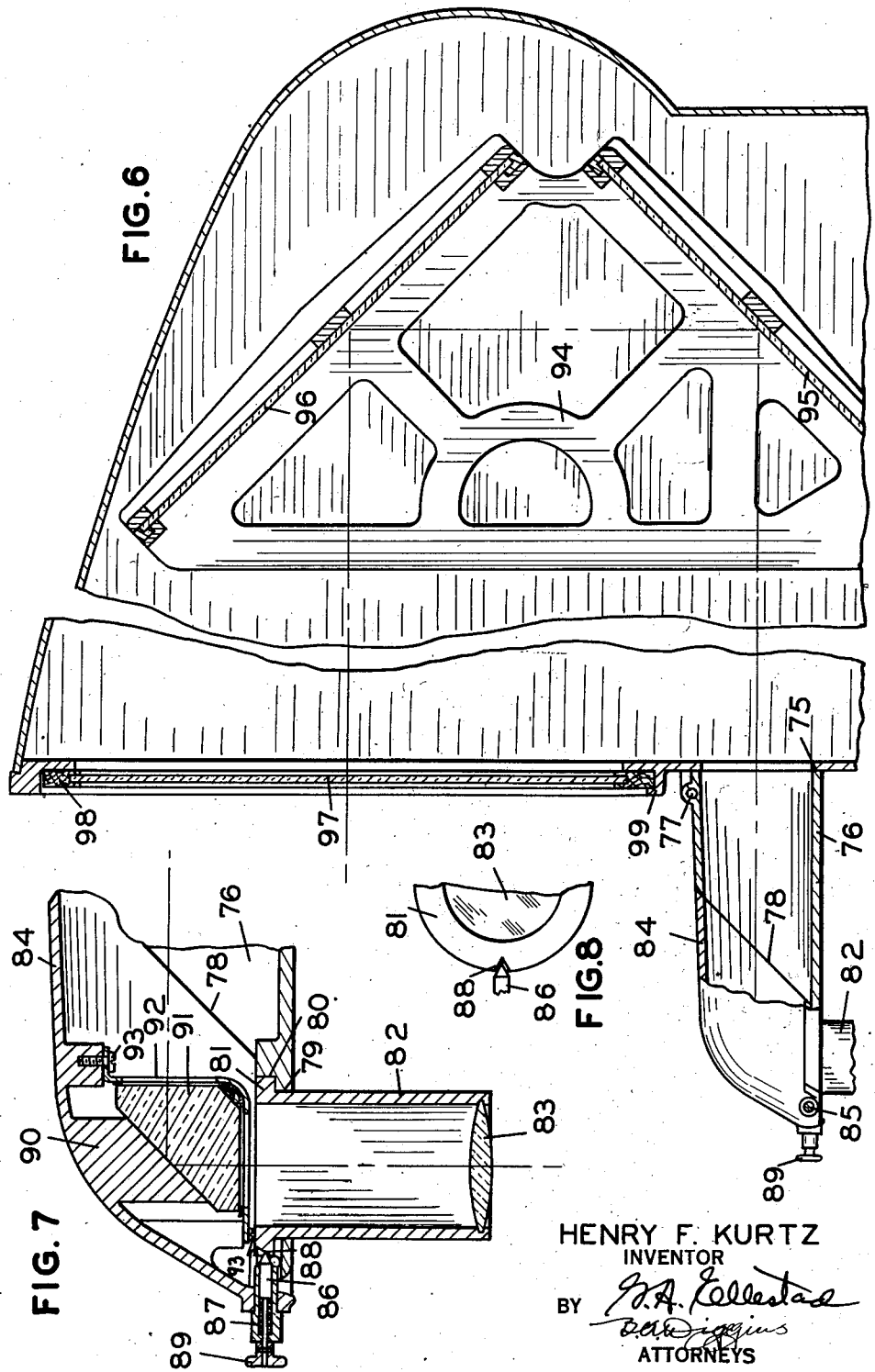
HENRY F. KURTZ
INVENTOR
BY
ATTORNEYS Patented Sept. 10, 1940

2,214,376

UNITED STATES PATENT OFFICE 2,214,376

PROJECTION APPARATUS

Henry F. Kurtz, Rochester, N. Y., assignor to Bausch & Lomb Optical Company, Rochester, N. Y., a corporation of New York Application September 21, 1938, Serial No. 231,023

6 Claims. (Cl. 88—24)

The present invention relates to optical instruments and more particularly to contour measuring projectors.

One of the objects of the present invention is to provide a rugged and precise contour measuring projection apparatus in which the optical elements are convenient and accessible for changing or cleaning. Another object is to provide a new and improved lens mount for a contour measuring projector. A further object is to provide a new and improved illuminating system for a contour measuring projector. These and other objects and advantages reside in certain novel features of construction, arrangement and combination of parts as will hereinafter be more fully set forth and pointed out in the appended claims.

Referring to the drawings:

Fig. 2 is a fragmentary vertical section of the lower part thereof.

Fig. 3 is a section taken on line 3—3 of Fig. 2.

Fig. 6 is a fragmentary vertical section of the upper part of my projector.

Fig. 7 is an enlarged vertical section of the lens and prism mount.

Fig. 8 is a fragmentary plan view of the lens positioning means.

Figure 1:
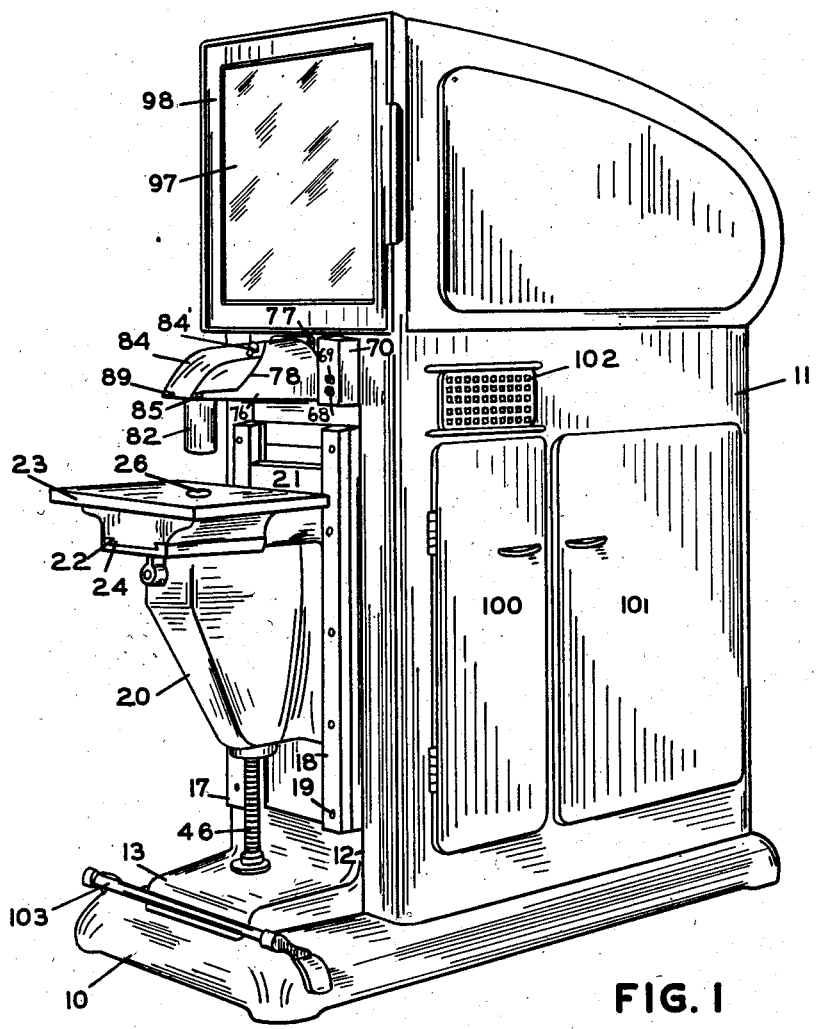
Fig. 1 is a perspective view of a contour measuring projector embodying my invention.
Figure 4:
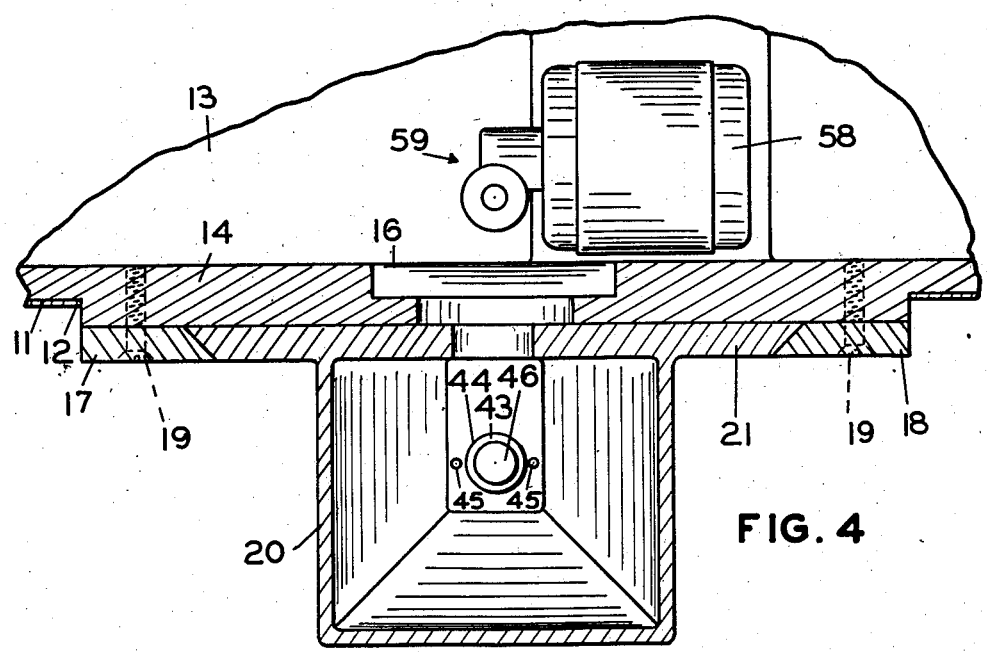
Fig. 4 is a section taken on line 4—4 of Fig. 2.

The present invention is an improvement on the invention described and claimed in U. S. Patent No. 1,934,582 issued November 7, 1933, to Edward Bausch and myself for Projection apparatus.

The projection apparatus of the present invention consists of a base 10 upon which is mounted a large housing 11. This housing 11 has an opening 12 in the lower part of its front wall and a hollow sub-base 13 having an upright portion 14 is secured in the opening 12 by bolts 15 which extend through the base 10. The upright portion 14 is provided with a vertical opening 16 and two vertical bearing guides 17 and 18 are secured, one on each side of the opening 16, as, for example, by screws or bolts 19.

A hollow casing 20 has at its rear end a flat plate 21 which is slidably mounted in the bearing guides 17 and 18. The top of this casing 21 is formed as a dovetail guide 22 and a suitable object support or stage 23 is provided with a complementary dovetail slide 24. The stage 23 is thus readily removable from the casing 20 and other supports can be readily substituted. The stage 23 illustrated is flat and horizontal and is provided with an aperture 25 within which is secured a glass plate 26.

Within the casing 20 is a tubular compartment 27 which has an opening 28 through which a water cell 29 may be inserted. A cap 30 serves to close the opening 28. Of course a plurality of water cells, filters or the like can be placed in the compartment 27 if desired.

The plate 21 is recessed around the end of the compartment 27 and a threaded ring 31 is fixed in the recess by screws or bolts 32. A tube 33 threaded into the ring 31 extends rearwardly through the opening 16 and carries at its outer end a lamp housing 34 within which is mounted a suitable lamp 35 such as a tungsten arc lamp. A suitable condensing system 36 is slidably mounted in the tube 33 and this system is adjusted by means of the handle 37 preferably until the light rays from the lamp 35 are substantially parallel. Of course the rays could be converging or diverging but I prefer a substantially parallel beam.

A suitable reflector 38 is fixed on a stub shaft 39 by a set screw 40 and this stub shaft is fixed in an opening 41 in the wall of the casing 20 by a set screw 42. The reflector 38 is so positioned that it receives the light rays through the compartment 27 and directs them vertically upward through the aperture 25 in the stage or object support 23.

A nut 43 is secured in an opening 44 at the bottom of the casing 20 by bolts 45 and a vertical screw 46 is threaded in this nut. This screw 46 is rotatably journalled in a bearing 47 which is secured on the sub-base by bolts 48. The screw 46 is rotated by a gear 49 fixed at its lower end within the sub-base 13 and which in turn is driven by a gear 50 rotatably mounted on a stud 51. A gear 52 fixed on a shaft 53 serves to drive the gear 50.

The shaft 53 carrying the gear 52, is rotatably journalled at its lower end in a bearing 54 carried by a bracket 55 secured to the sub-base 13. This shaft 53 extends upwardly through a hole 56 in the sub-base 13 and is directly connected to a shaft 57. A motor 58 drives the shaft 57 through suitable reduction gearing indicated generally at 59.

Figure 5:
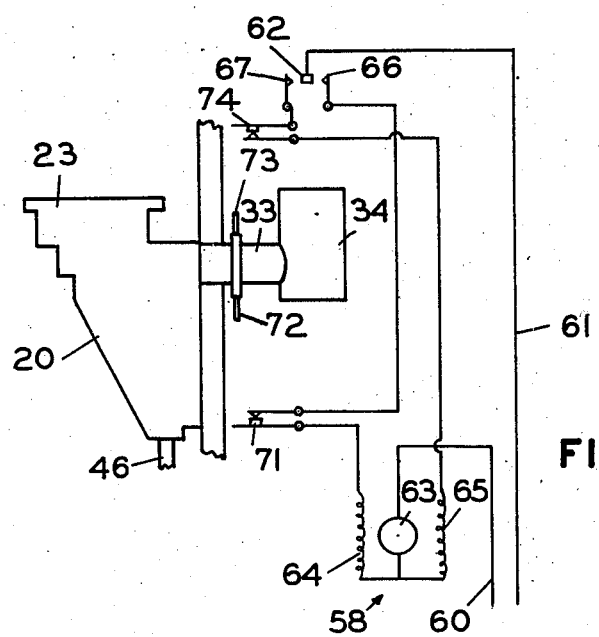
Fig. 5 is a wiring diagram of the stage moving mechanism.

The motor circuit shown in Fig. 5 is substantially the same as the motor circuit described and claimed in U. S. Patent No. 2,065,952 issued December 29, 1936, to Otto E. Trautmann. This circuit consists of two wires 60 and 61 which are connected to a source of power and which lead, respectively, to a switch contact 62 and one side of the armature 63 of the motor 58. The field of the motor 58 is split into two opposed windings 64 and 65 so that when the contact 66 is closed against the contact 62, the field winding 64 will be energized and the motor 15 will rotate in one direction while closing the contact 67 against the contact 62 energizes the field winding 65 and causes the motor 15 to rotate in the opposite direction. The contacts 66 and 67 are actuated by push buttons 68 and 69, respectively, carried by a switch box 70 mounted in a convenient position on the front of the apparatus just above the bearing guide 18.

In order to limit the movement of the casing 20 to predetermined limits, a switch 71 which is normally closed, is placed in the circuit with the field winding 64 which causes the motor 58 to rotate in the direction to lower the casing 20. A suitable projection 72 is secured on the table 33 and, when the casing 20 reaches the predetermined lower limit of its travel, this projection opens the switch 71 and thus stops the motor 58. A similar projection 73 and a similar, normally closed switch 74 in the circuit with the field winding 65, serve to limit the upward movement of the casing 20 under the actuation of the motor 58.

The optical system for forming an image of an object supported by the stage 23 is illustrated in Figs. 1, 6, 7 and 8. Above and beyond the path of travel of the casing 20 and stage 23, the front wall of the housing 11 is provided with an opening 75. A tube 76 is pivotally mounted on a hinge pin 77 which is secured to the front wall of the housing 11 above the opening 75. Normally, the tube 76 swings downwardly on the hinge pin 77 forming a light tight connection with the housing 11 about the opening 75.

The tube 76 extends outwardly from the housing 11 above the stage 23 and has a large opening 78 in its top at its outer end. The bottom wall of the tube 76 has an opening 79 in substantial alignment with the aperture 25 in the stage 23. A recess 80, surrounding the opening 79, forms a seat for receiving the flange 81 of a mount 82 carrying an objective lens 83.

A cover 84 for the opening 78 is hingedly connected at 85 at the outer end of the tube 76. A pin 86 which is slidably mounted in the cover 84 is urged by a spring 87 toward the lens mount 82. The upper surface of the flange 81 of the lens mount 82 is provided with a tapered notch 88 and the pin 86 engaging this notch 88 presses the flange 81 firmly into the seating recess 80. A head 89 is fixed to the pin 86 to permit withdrawal of the pin 86 from the notch 88.

Directly above and in alignment with the opening 79, the cover 84 has a seat 90 for receiving a prism 91. This prism 91 is preferably a right angle, roof prism as illustrated in U. S. Patent No. 1,934,582 mentioned above. The prism 91 is secured in its seat 90 by a strap 92 attached to the cover 84 by suitable screws or bolts 93.

Within the upper part of the housing 11 is a bracket 94 carrying two first surface reflectors 95 and 96 at right angles to each other. The reflector 95 receives the image beam from the prism 91 and reflects it upwardly to the reflector 96 from which it is reflected to a translucent screen 97 in the front wall of the housing 11.

The screen 97 is mounted in a frame 98 and is carried by a ledge 99 on the front wall of the housing 11. Thus it is apparent that the screen 97 may be readily removed and other image receiving surfaces substituted. For example, a photosensitive sheet could be substituted and a photograph made of the object on the stage 23. Or the image of the object could be formed on a suitable drawing of the object to check the shape and dimensions.

The side wall of the housing 11 is provided with two openings closed by doors 100 and 101. The forward door 100 permits access to the light source 35 and motor 58 and a grid or screen 102 above the door 100 permits the escape of heat from the lamp 35 and motor 58.

The door 101 permits access to a suitable storage compartment in the housing 11 where various accessories such as lenses, stages or screens may be conveniently kept.

The lens 83, prism 91, reflectors 95 and 96 and screen 97 are all fixed relative to each other so that an object in the object plane of the lens 83 will be imaged on the screen at a fixed magnification. The instrument is furnished with a series of lenses giving standard magnifications, for example, 10X, 25X, 50X and 100X and the operator selects the lens giving the magnification desired. The cover 84 is opened by means of the handle 84' and the selected lens is dropped through the opening 78 so that its flange 81 seats in the recess 80. The cover 84 is then closed and the pin 86 engaging in the notch 88 forces the lens tightly into the seating recess.

The object to be projected is then placed on the stage 23 over the glass plate 26 and the lamp 35 is lit. The object is then brought into focus by pressing either the button 68 or the button 69 and operating the motor 58 to raise or lower the stage 23 by means of the screw 50. During focusing, the operator should keep his eyes on the screen and stop the motor when the image is sharp. The hinged connection between the tube 76 and the housing 11 prevents any injury to the lens 83 or prism 91 in the event that the object strikes the lens. A foot rest 103 on the front of the base 10 prevents scarring the base 10 or wearing off the paint.

From the foregoing, it will be apparent that I am able to attain the objects of my invention and provide a new and improved contour measuring projector which is rugged and accurate in operation. Various modifications of structure can, of course, be made without departing from the spirit of my invention or the scope of the appended claims.

I claim:

1. A contour measuring projector comprising a base, a vertical objective lens carried by said base, an image screen, means for directing an image formed by said lens to said screen, an object support vertically movably mounted on said base beneath and in alignment with said lens, means for moving said object support vertically toward and from said lens to bring an object supported thereby into the focal plane of said lens, and a source of light carried by and movable with said object support for illuminating an object on the support.

2. A projection apparatus comprising a base, a vertical objective lens carried by said base, an image screen, means for directing an image formed by said lens to said screen, a pair of vertical guides carried by said base, said guides being beneath and in a plane out of alignment with said lens, an object support vertically slidable in said guides and projecting outwardly therefrom into alignment with said lens, a tube arried by said object support, said tube projecting beyond said guides in the opposite direction from said object support, a light source carried by said tube, means for directing light from the source through the tube to the object support and means for moving the object support in said guides to bring an object carried thereby into the focal plane of said lens.

3. A contour measuring projector comprising a base, a vertical wall carried by said base, a horizontally disposed stage vertically movably mounted on said wall, a source of light carried by said stage, means carried by the stage for directing light rays from the source vertically upward through the stage, means for moving said stage vertically, a horizontal, hollow, tubular holder carried by said wall above the stage, said holder having an opening in its top wall for receiving a lens, lens positioning means within the holder, a lens carried by the positioning means for receiving light from said stage, a closure for said opening, reflecting means carried by said closure in alignment with said lens for laterally reflecting light rays from said lens, an image screen vertically carried by said wall above said holder, and means for directing light from the reflecting means to said screen.

4. A projection apparatus for gaging and measuring objects comprising a support, means carried by said support for producing a vertical beam of light rays, a horizontally disposed stage adjustably mounted on said support for holding objects to be gaged in said beam, a holder mounted on said support above said stage, said holder having an opening for receiving a lens, lens positioning means within said holder, a lens carried by said positioning means, a closure removably mounted on said holder to close said opening, reflecting means carried by said closure in alignment with said lens for laterally deflecting light rays from said lens, an image screen vertically positioned above said holder, and means for directing the light from the reflecting means to said screen.

5. A projection apparatus for gaging and measuring objects comprising a support, a horizontally disposed stage adjustably mounted on said support, means carried by said stage for producing a vertical beam of light rays, a horizontal tubular lens holder carried by said support above said stage, said holder having an opening in its top wall and a lens receiving aperture in its lower wall above said stage, a seat surrounding said aperture, an objective lens, a mount for said lens, a flange extending outwardly from said mount to engage said seat, means for locking said lens in said seat, a closure for the opening, deflecting means carried by said closure for receiving light from said lens and directing it through said holder, an image screen vertically carried by said support above said holder and means for directing the light from said deflecting means onto said screen.

6. A contour measuring projector comprising a base, a vertical objective lens carried by said base, an image screen, means for directing an image formed by said lens to said screen, an object support vertically movably mounted on said base beneath said lens, said support having a transparent portion in alignment with said lens for supporting an object to be projected, means for moving said object support vertically to bring said object into the focal plane of said lens, a source of light carried by said object support beneath said transparent portion, and means for directing light from said source upward through said transparent portion toward said lens.

HENRY F. KURTZ.